(12) United States Patent
Thiel

(10) Patent No.: US 9,889,775 B2
(45) Date of Patent: Feb. 13, 2018

(54) DETENT FITTING FOR A VEHICLE SEAT, AND VEHICLE SEAT

(71) Applicant: Johnson Controls Components GmbH & Co. KG, Kaiserslautern (DE)

(72) Inventor: Peter Thiel, Remscheid (DE)

(73) Assignee: Johnson Controls Components GmbH & Co. KG, Kaiserslautern (DE)

( * ) Notice: Subject to any disclaimer, the term of this patent is extended or adjusted under 35 U.S.C. 154(b) by 244 days.

(21) Appl. No.: 14/767,332

(22) PCT Filed: Feb. 13, 2014

(86) PCT No.: PCT/EP2014/052835
§ 371 (c)(1),
(2) Date: Aug. 12, 2015

(87) PCT Pub. No.: WO2014/125032
PCT Pub. Date: Aug. 21, 2014

(65) Prior Publication Data
US 2016/0001680 A1    Jan. 7, 2016

(30) Foreign Application Priority Data

Feb. 14, 2013  (DE) .......................... 10 2013 002 819
Feb. 25, 2013  (DE) .......................... 10 2013 003 442
(Continued)

(51) Int. Cl.
*B60N 2/235*    (2006.01)
*B60N 2/22*     (2006.01)
*B60N 2/20*     (2006.01)

(52) U.S. Cl.
CPC ............ *B60N 2/2358* (2013.01); *B60N 2/20* (2013.01); *B60N 2/2213* (2013.01);
(Continued)

(58) Field of Classification Search
CPC .. B60N 2/2358; B60N 2/2356; B60N 2/2352; B60N 2/2213; B60N 2/2227; B60N 2205/50
(Continued)

(56) References Cited

U.S. PATENT DOCUMENTS 6,149,235 A * 11/2000 Fahim .................. B60N 2/2356
297/259.2
7,571,962 B2    8/2009 Thiel et al.
(Continued)

FOREIGN PATENT DOCUMENTS

DE    10 2005 046807 B3    11/2006
DE    10 2006 015560 B3    8/2007
(Continued)

*Primary Examiner* — Milton Nelson, Jr.
(74) *Attorney, Agent, or Firm* — McGlew and Tuttle, P.C.

(57) ABSTRACT

A detent fitting for a motor vehicle seat includes a first fitting part (11) and a relatively rotatable second fitting part (12) and catches (16) guided by one fitting part between a locked state and an unlocked state to lock the detent fitting upon interacting with a gear ring of another fitting part. A third fitting part (74) is pivotably mounted and is lockable with a detent plate (115) fixed to the first fitting part or with the first fitting part by a pawl (80) which is mounted in a hinge point on the third fitting part. The third fitting part, a locking cam (90) with a hinge point on the third fitting part, a coupling (98) connected to the locking cam with a hinge point and the pawl with a hinge point define a four-link chain. A vehicle seat with at least one such detent fitting is also provided.

16 Claims, 7 Drawing Sheets

(30) Foreign Application Priority Data

Oct. 21, 2013 (DE) .......................... 10 2013 221 307
Dec. 16, 2013 (DE) .......................... 10 2013 226 002

(52) U.S. Cl.
CPC ......... *B60N 2/2227* (2013.01); *B60N 2/2352* (2013.01); *B60N 2205/50* (2013.01)

(58) Field of Classification Search
USPC .......................................... 297/367 R, 367 P
See application file for complete search history.

(56) References Cited

U.S. PATENT DOCUMENTS

| | | | | |
|---|---|---|---|---|
| 7,614,700 B2 * | 11/2009 | Peters | ................... | B60N 2/2356 297/367 P |
| 2012/0169105 A1 * | 7/2012 | Assmann | ............... | B60N 2/236 297/367 P |
| 2014/0361594 A1 * | 12/2014 | Thiel | ....................... | B60N 2/20 297/362 |

FOREIGN PATENT DOCUMENTS

| | | |
|---|---|---|
| DE | 10 041 604 B4 | 11/2007 |
| DE | 10 2008 026176 A1 | 12/2009 |
| DE | 20 2010 015093 U1 | 1/2011 |
| DE | 10 2010 020013 A1 | 11/2011 |
| EP | 0 705 727 B1 | 6/1997 |

\* cited by examiner

DETENT FITTING FOR A VEHICLE SEAT, AND VEHICLE SEAT

CROSS REFERENCE TO RELATED APPLICATIONS

This application is a United States National Phase Application of International Application PCT/EP2014/052835 filed Feb. 13, 2014 and claims the benefit of priority under 35 U.S.C. § 119 of German Patent Applications 10 2013 002 819.1 filed Feb. 14, 2013, 10 2013 003 442.6 filed Feb. 25, 2013, 10 2013 221 307.7 filed Oct. 21, 2013 and 10 2013 226 002.4 filed Dec. 16, 2013, the entire contents of which are incorporated herein by reference.

FIELD OF THE INVENTION

The invention relates to a detent fitting comprising a first fitting part and a second fitting part which are rotatable relative to each other, and comprising catches which are guided movably in one of the two fitting parts between a locked state and an unlocked state, and which, in the locked state, interact with a toothed ring of the other of the two fitting parts in order to lock a first locking mechanism of the detent fitting, and comprising a third fitting part which is mounted pivotably relative to the first fitting part on the first fitting part, wherein the third fitting part is lockable with a detent plate fastened to the first fitting part or with the first fitting part by means of a pawl which is mounted in a first hinge point on the third fitting part, as a result of which the detent fitting has a second locking mechanism. The invention furthermore relates to a vehicle with the features of the detent fitting.

BACKGROUND OF THE INVENTION

EP 0 705 727 B1 discloses a fitting system for a vehicle seat with a free-pivoting function and memorization of the backrest inclination. The fitting system comprises a first detent fitting, a second detent fitting and a transmission element between the two detent fittings. Each detent fitting has a shaft piece, the rotation of which unlocks the detent fitting. To adjust the inclination of a backrest, the shaft piece is rotated by means of a first operating element on the second detent fitting, and a first lever seated on said shaft piece in a torsionally rigid manner is pivoted. The first lever takes along a second lever, which is connected in a torsionally rigid manner to the transmission element. The pivoting second lever rotates the transmission element, which transmits the rotary motion to the shaft piece of the first detent fitting. Both detent fittings unlock. To allow the backrest to be pivoted freely, the second detent fitting is assigned a free-pivoting device, as the second locking mechanism of the second detent fitting, which free-pivoting device is lockable by means of a pivotable pawl. The pawl is opened by means of a second operating element, and the pawl pivots the second lever by means of a cable pull as said pawl pivots open. The pivoting second lever rotates the transmission element, which transmits the rotary motion to the shaft piece of the first detent fitting. The first detent fitting and the free-pivoting device assigned to the second detent fitting unlock, while the second detent fitting remains locked. By means of the fitting system described, memorization of the backrest inclination is achieved. When the backrest is pivoted freely and then pivoted back, the previously set backrest inclination is resumed. The free-pivoting function facilitates access to a rear seat row, in particular in the case of two-door vehicles.

A fitting system with memorization of the backrest inclination and an additional free-pivoting device on one of two detent fittings is also known from DE 10 2008 026 176 A1.

DE 20 2010 015 093 U1 discloses a further fitting system for a vehicle seat with a free-pivoting function and memorization of the backrest inclination. An adjustment fitting for adjusting the inclination of the backrest and a free-pivoting fitting are designed as separate detent fittings and are arranged next to each other in the axial direction with respect to the pivot axis of the backrest. Such an arrangement requires the construction space in the axial direction for two detent fittings next to each other.

A geared fitting with a free-pivoting function is known from U.S. Pat. No. 7,571,962 B2. A first fitting part and a second fitting part are in geared connection with each other in order to adjust the inclination of the backrest. The third fitting part is mounted pivotably on a bearing ring fastened to the first fitting part. Furthermore, a separately formed detent element sits on the bearing ring and is fastened thereto such that said detent element is fixedly connected to the first fitting part. A toothed pawl which is pivotably mounted on the third fitting part locks with the detent element, which is likewise toothed in a radially protruding region for this purpose. If the pawl is opened, the backrest is freely pivotable. The free pivoting serves in particular for easier access of passengers to a rear seat row.

SUMMARY OF THE INVENTION

The invention is based on the problem of improving a detent fitting with an additional free-pivoting function, in particular for a fitting system of the type mentioned at the beginning, in particular of providing a secure and play-free locking, which is optimized at the same time in terms of weight and construction space, for the one additional free-pivoting function of the detent fitting.

Owing to the additional free-pivoting function, the detent fitting has two locking mechanisms. A first locking mechanism serves for adjusting the inclination of a backrest of the vehicle seat within a comfort adjustment range; a second locking mechanism serves for additionally freely pivoting the backrest when the first locking mechanism is locked, in particular in order to facilitate entry to a rear seat row.

Owing to the fact that the third fitting part, a locking cam which is mounted in a second hinge point on the third fitting part, a coupler which is connected in an articulated manner to the locking cam in a third hinge point and to the pawl in a fourth hinge point, and the pawl define a four-bar chain, (four-bar linkage) a detent fitting which is optimized in terms of cost and weight and has an additional free-pivoting function is provided. The detent fitting according to the invention can replace both an adjustment fitting for adjusting the inclination of the backrest and a free-pivoting fitting in the fitting system known from DE 20 2010 015 093 U1 and takes up less construction space here.

A fitting system, in particular for attaching the backrest of a vehicle seat to a seat part, can comprise one or more, in particular two, detent fittings according to the invention.

The free-pivoting function is locked by means of a pawl system, in which a locking cam which is mounted in a second hinge point on the third fitting part, a coupler which is connected in an articulated manner to the locking cam in a third hinge point and to the pawl in a fourth hinge point, and the pawl define a four-bar chain. As a result, the pawl can be locked in the region of a dead center position, in which forces acting in an opening manner on the pawl, in particular crash forces, can be supported in a particularly simple, but effective manner.

The gear members of the four-bar chain do not have to be connected to one another via pure turning joints. In a preferred manner, one of the hinge points of the four-bar chain is designed as a turning and sliding joint and the remaining hinge points as pure turning joints. As a result, the pawl can be locked beyond the dead center position. It is particularly effective when the second hinge point is designed as a turning and sliding joint and the remaining hinge points are designed as turning joints.

A play inevitably present in the four-bar chain because of the turning and sliding joint has no negative effects on the freedom of the locking from play in the normal operation of the seat if a spring prestresses the four-bar chain, in particular the locking cam, in the direction of the locked position of the pawl and pivots the locking cam into contact against the pawl. A pawl locking cam designed as a clamping surface preferably within the self-locking arrangement is thereby clamped against the locking surface of the first fitting part without the turning and sliding joint having to be set in a play-free manner as a result of a maximum deflection in the translation direction.

The dead center position can be produced in a particularly simple manner by, in the locked state of the pawl, the third hinge point lying on an imaginary connecting line between the second hinge point and the fourth hinge point or the third hinge point lying between the connecting line and the pawl.

The detent fitting is preferably unlocked by, in order to unlock the pawl, the locking cam being pivoted counter to the force of the spring and, in the process, the four-bar chain moving the pawl in the direction of the unlocked position thereof. For this purpose, the locking cam comprises a bearing journal which is mounted rotatably in an opening of the third fitting part, thus forming the second hinge point. The bearing journal preferably has a profiled interface, in particular a polygonal form, for the at least indirect connection to a hand lever on the backrest of the vehicle seat.

A bearing ring is preferably connected, preferably fixedly connected, in particular welded, to the first fitting part. The bearing ring supports the third fitting part relative to the first fitting part. As a result, the third fitting part does not have to be mounted directly on the first fitting part, which significantly facilitates the integration of a free-pivoting function also on a disk-shaped detent fitting which is known per se and which was originally designed without a free-pivoting function.

A play which is optionally present in the detent fitting can preferably be adjusted by the fact that the bearing surface of a bearing ring and the inner surface of a bearing opening in the third fitting part are of noncircular design in such a manner that, by rotation of the bearing ring before the latter is fastened to the first fitting part, the play can be adjusted. Such a manner of adjusting the play is known, for example, from DE 100 41 604 B4. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
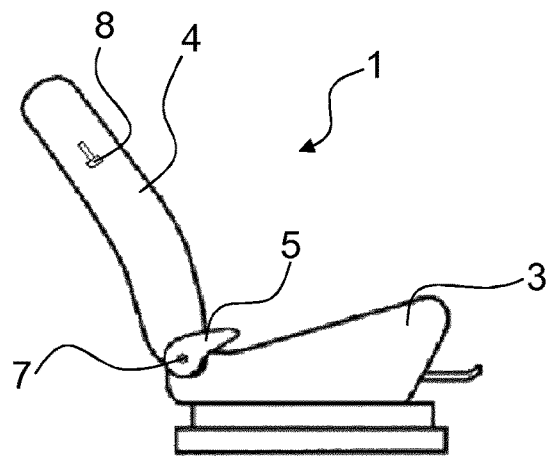
FIG. 1 is a schematic illustration of a vehicle seat.
Figure 2:
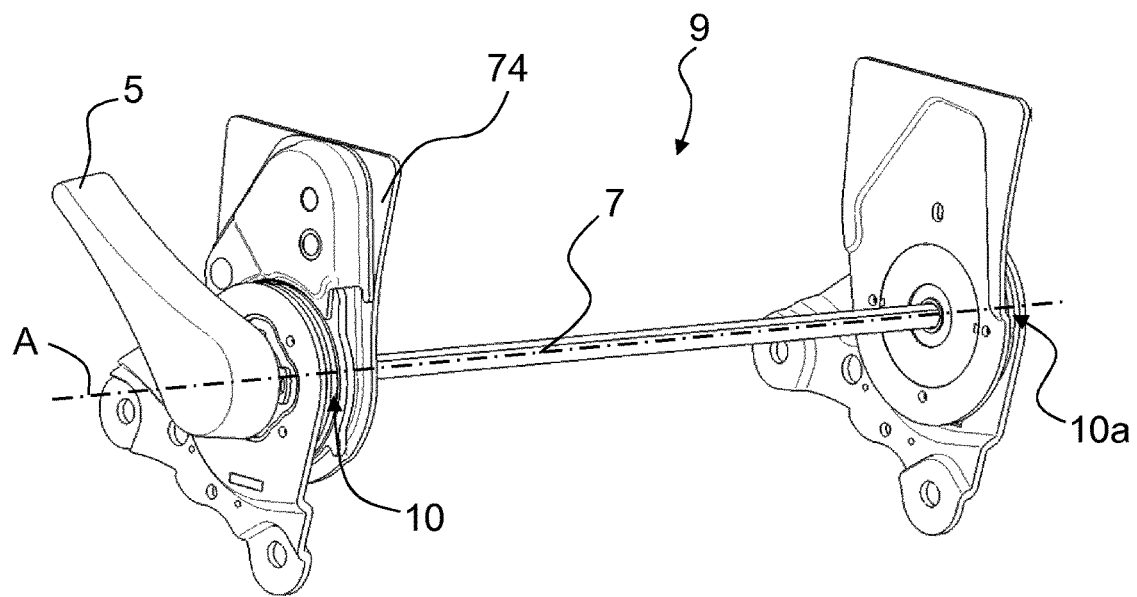
FIG. 2 is a perspective illustration of a fitting system of the vehicle seat from FIG. 1.
Figure 3:
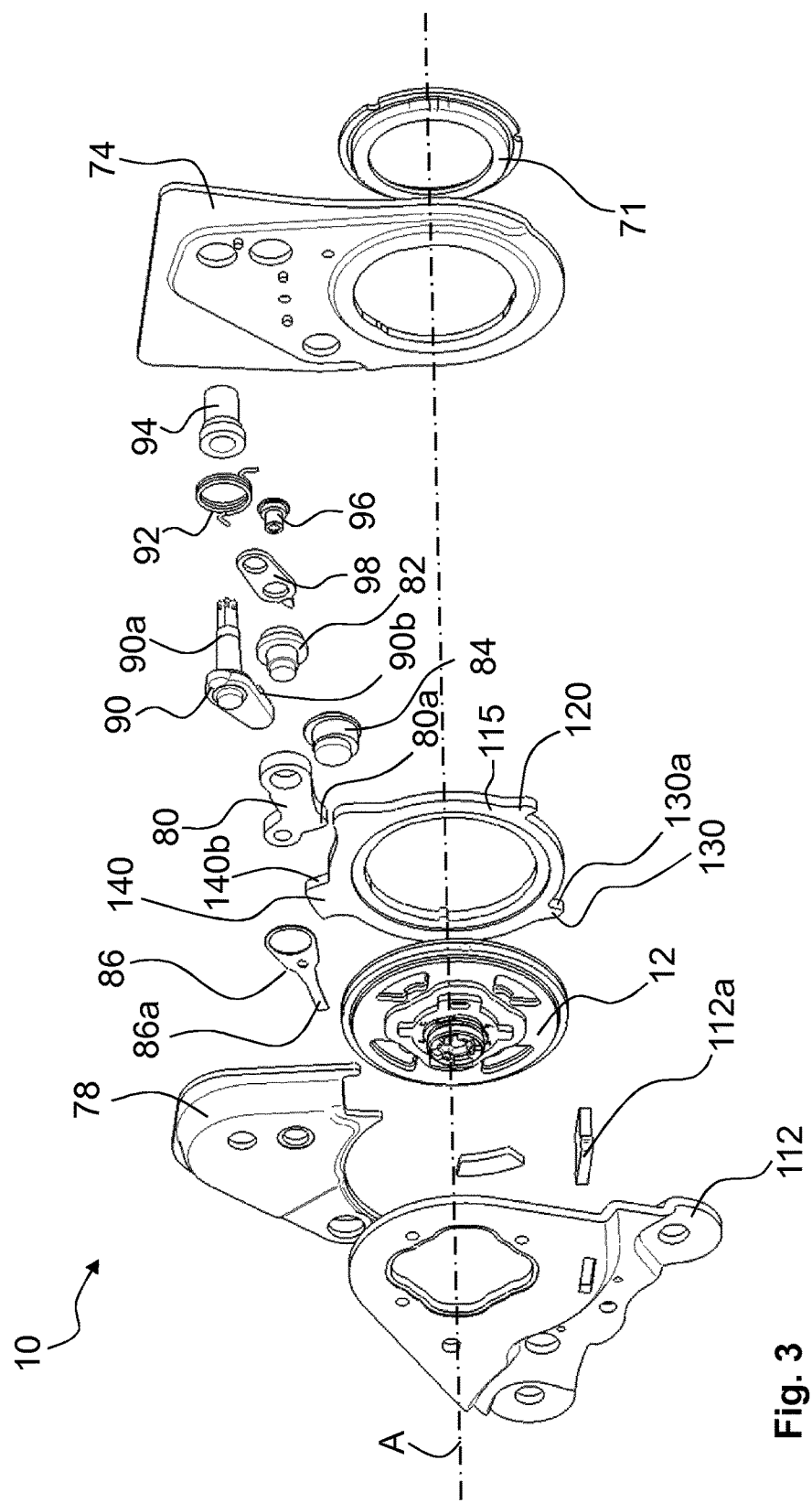
FIG. 3 is an exploded illustration of a detent fitting including an adapter, in particular of a second locking mechanism for the free-pivoting function of the detent fitting.
Figure 4:
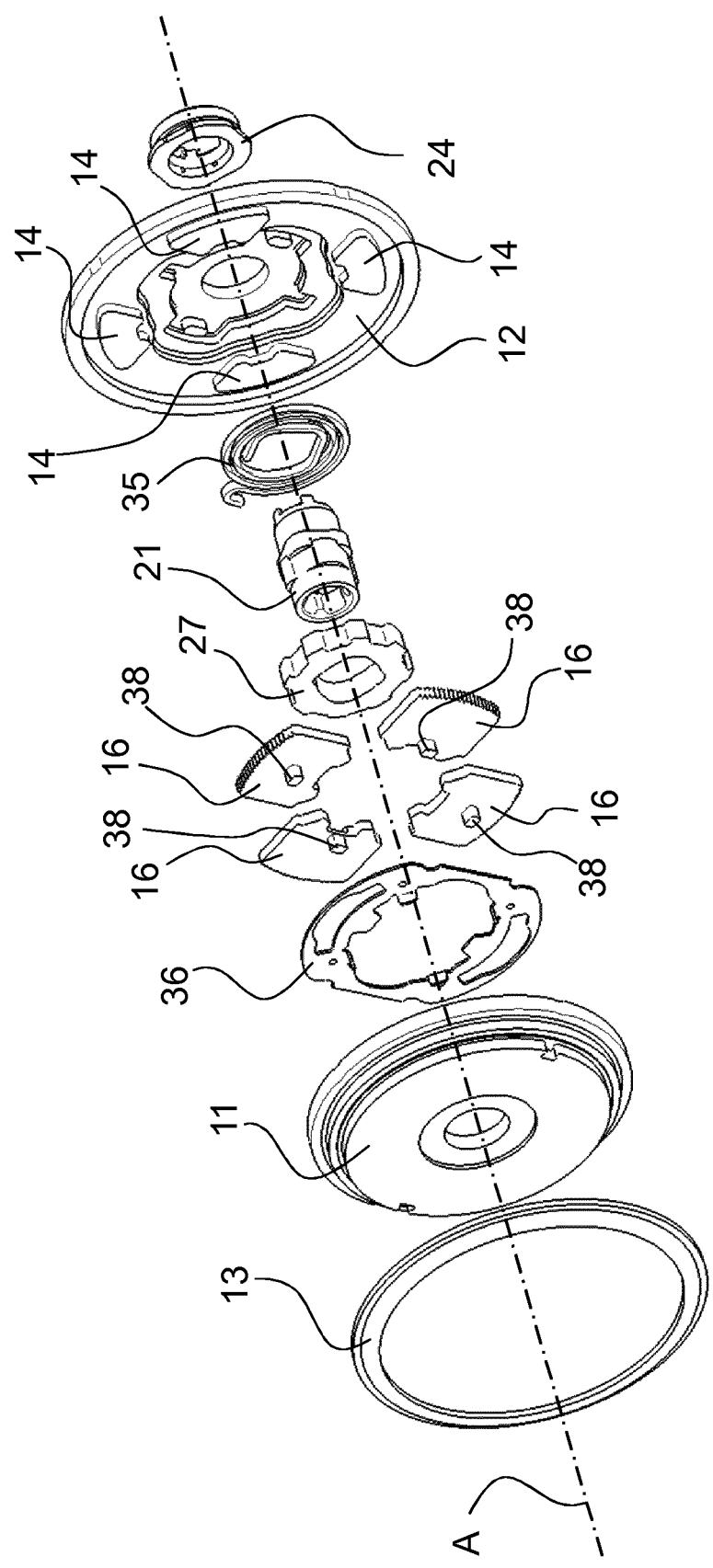
FIG. 4 is an exploded illustration of a disk-shaped unit with a first locking mechanism of the detent fitting with the first fitting part illustrated in simplified form.
Figure 5:
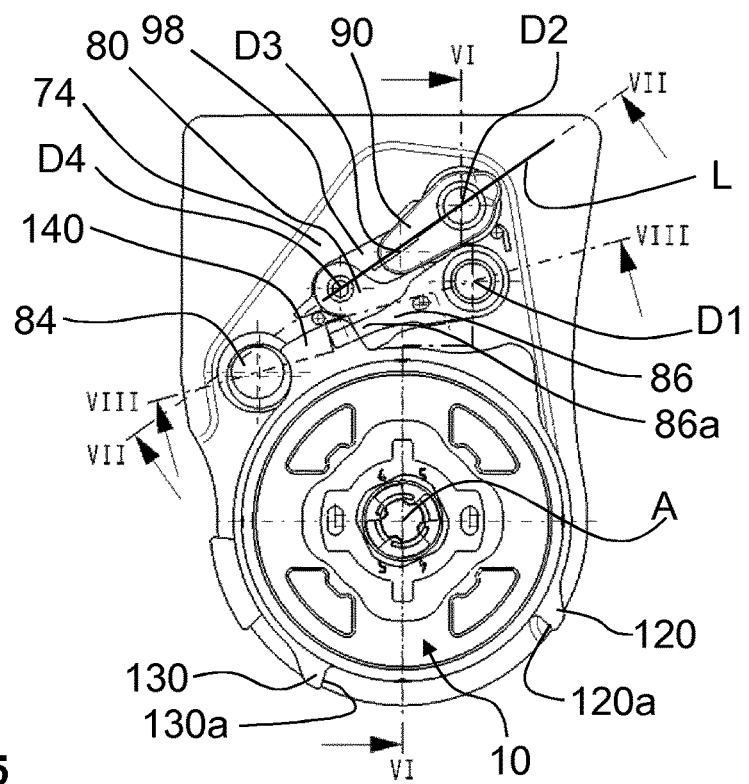
FIG. 5 is a top view of the detent fitting.
Figure 6:
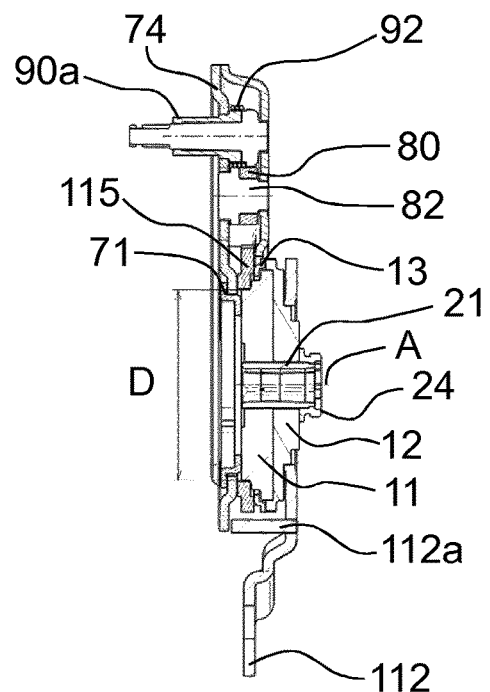
FIG. 6 is a sectional view through the detent fitting along the line VI-VI in FIG. 5.
Figure 7:
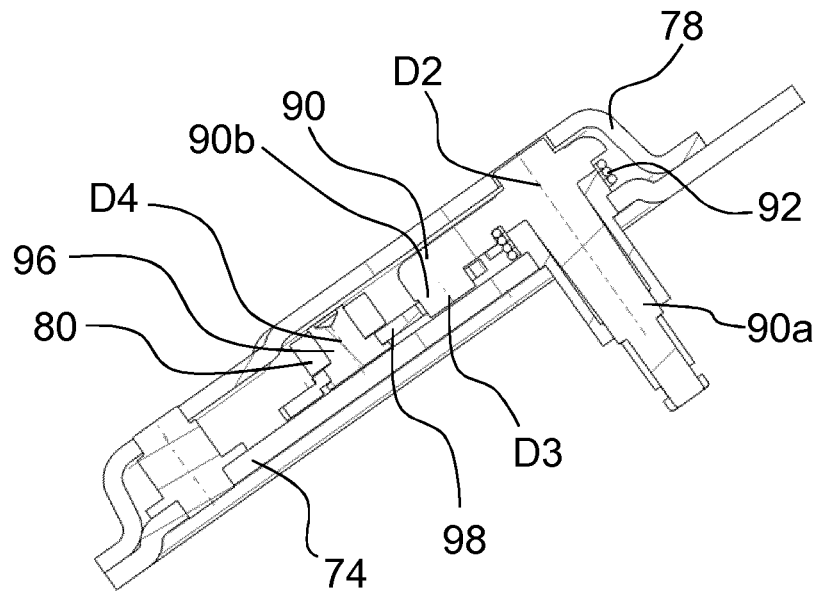
FIG. 7 is a sectional view through the detent fitting along the line VII-VII in FIG. 5.
Figure 8:
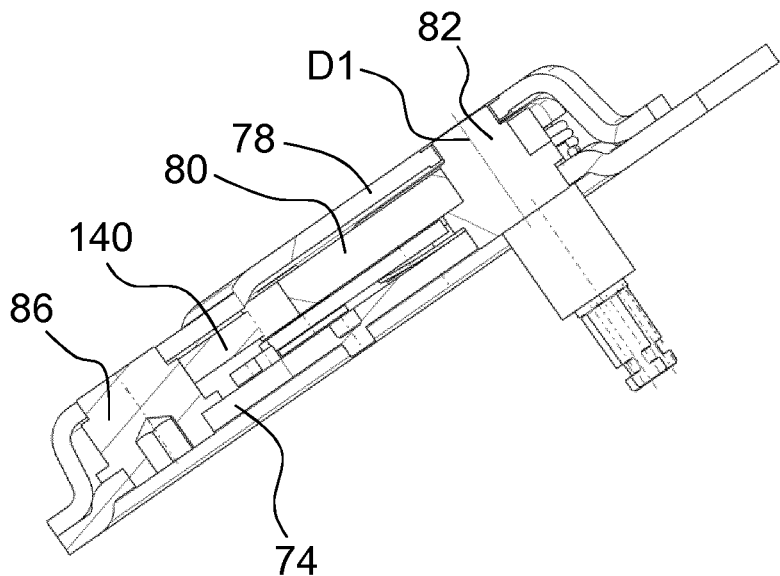
FIG. 8 is a sectional view through the detent fitting along the line VIII-VIII in FIG. 5.

A vehicle seat 1 for a motor vehicle has a seat part 3 and a backrest 4 which is adjustable in the inclination thereof relative to the seat part 3. By means of a fitting system 9, the backrest 4 is firstly adjustable in the inclination thereof relative to the seat part 3, as a result of which a plurality of use positions are defined, and, secondly, is freely pivotable, i.e. can be pivoted forward into a non-use position in order, for example, to facilitate the access to a rear seat row. The fitting system 9 has a fitting on each side of the vehicle seat.

A first fitting 10 has two locking mechanisms. A first locking mechanism acts between a first fitting part 11 and a second fitting part 12. In addition, a second locking mechanism, which is realized as an integrated free-pivoting device, acts between a detent plate 115, which is connected to the first fitting part 11, and a third fitting part 74. In a modification of the exemplary embodiment, the detent plate 115 is integrated in the first fitting part 11.

A second fitting 10a is realized without an additional free-pivoting device, that is to say, said fitting has only a first locking mechanism in a disk-shaped unit. The two fittings 10, 10a are coupled to each other in a manner described in DE 10 2008 026 176 A1 via a transmission element designed as an unlocking shaft 7. The unlocking shaft 7 defines the directional terms which are used of a cylindrical coordinate system. The first fitting 10 with the free-pivoting device is referred to below as the detent fitting 10.

In order to adjust the inclination of the backrest 4, the unlocking shaft 7 which is arranged horizontally in the transition region between seat part 3 and backrest 4 is actuated manually, for example by means of an operating lever 5, or in a motorized manner, for example by means of an electric motor. On both sides of the vehicle seat 1, the unlocking shaft 7 engages in the two fittings 10, 10a in such a manner that a rotation of the unlocking shaft 7 about the longitudinal axis thereof unlocks the two first locking mechanisms of the fittings 10, 10a such that the inclination of the backrest 4 can be changed. The free-pivoting device as the second locking mechanism of the detent fitting 10 remains locked in the process.

By actuation of a hand lever 8, the free-pivoting device of the detent fitting 10 and the second fitting 10a are unlocked, and therefore the backrest can be freely pivoted. The first locking mechanism between the first fitting part 11 and the second fitting part 12 of the detent fitting 10 remains locked in the process.

The detent fitting 10, that is to say, the first fitting with the additional free-pivoting device, is described below. The first fitting part 11 and the second fitting part 12 of the detent fitting 10 are rotatable relative to each other about an axis A. The axis A is in alignment here with the central axis of the unlocking shaft 7. The two fitting parts 11 and 12 each approximately describe a circular disk shape. The two fitting parts 11 and 12 are preferably composed of metal, in particular of steel, which may be hardened at least in regions. For absorbing the axially acting forces, i.e. for holding the fitting parts 11 and 12 together axially, a clasp ring 13 is provided. The clasp ring 13 is preferably composed of metal, in particular steel, which is preferably non-hardened. The clasp ring 13 preferably has a substantially flat ring shape, but may also, in an alternative embodiment, have an L-shaped profile with a cylindrical section and, at an end side, a flat ring section.

The clasp ring 13 is fixedly connected to one of the two fitting parts 11 and 12, in the present case, in an outer ring section, to the second fitting part 12, for example by means of laser welding or by means of another fastening technique which is known per se. By means of an inner ring section which is arranged in a plane perpendicular to the axial direction, a clasp ring 13 engages over the first fitting part 11 in the radially outer edge region thereof, optionally with the interposition of a slide ring, without hindering the relative movement of the two fitting parts 11 and 12. In addition, the inner surfaces, which face each other, of the two fitting parts 11 and 12 are protected against the ingress of foreign bodies and dirt and against damage.

The clasp ring 13 and the fitting part 11 or 12 fixedly connected thereto thus clasp the other of the two fitting parts 11 and 12, which is movable relative to the clasp ring and the former fitting part. In structural terms, the two fitting parts 11 and 12 thus together (with the clasp ring 13) form a disk-shaped unit as a subassembly of the detent fitting 10.

With the mounting of the detent fitting 10, the second fitting part 12 is fixedly connected to the structure of the seat part 3, that is to say is fixed with respect to the seat part, by means of an adapter 112. The first fitting part 11 is fixedly connected, in the present case welded, to the detent plate 115, which is described in more detail below. The detent plate 115 can be locked to the third fitting part 74 by means of a pawl system, which is described in more detail below. The third fitting part 74 is mounted rotatably relative to the first fitting part 11. For this purpose, a bearing ring 71 is welded to the first fitting part 11 which rotatably supports the third fitting part 74. The third fitting part 74 is fixedly connected to the structure of the backrest 4. However, the assignments of the fitting parts 12 and 74 may be interchanged, that is to say the third fitting part 74 would then be fixed with respect to the seat part, and the second fitting part 12 would be fixed with respect to the backrest. The detent fitting 10 lies in the force flow between backrest 4 and seat part 3.

The first locking mechanism of the detent fitting 10 is designed as a fitting in which the first fitting part 11 and the second fitting part 12 are lockable to each other, as is described, for example, in DE 10 2006 015 560 B3, the disclosure of which in this regard is expressly incorporated here. DE 10 2010 020 013 A1 likewise discloses such a fitting.

The second fitting part 12 has guide segments 14—of which there are four in the present case—which, by way of paired straight guide surfaces, guide in each case one catch 16 laterally in the radial direction. The catches 16—of which there are a total of four in the present case—are arranged offset with respect to one another—in the present case by 90° in each case—in a construction space defined between the two fitting parts 11 and 12. The catches 16 are provided, on their radially outer ends, with a toothing which can engage (mesh) with a toothed ring of the first fitting part 11, which is in the form of an internal gear. When the toothed ring and the catches 16 interact, the first locking mechanism of the detent fitting 10 is locked. In an alternative embodiment, the number of the catches 16 is 1, 2, 3 or more than 4.

A driver 21 is arranged in the center of the detent fitting 10. The driver 21 extends in the direction of the axis A and is provided around the axis A with a passage opening for receiving the unlocking shaft 7.

An eccentric 27 which is arranged in the construction space defined between the fitting parts 11 and 12 sits in a torsionally rigid manner on the driver 21. A spring arrangement 35 is arranged in a central receptacle of one of the two fitting parts 11 and 12, in the present case of the second fitting part 12, and in the present case is externally supported thereon. The spring arrangement 35 acts upon the eccentric 27, in the present case by virtue of said spring arrangement being seated in a torsionally rigid manner on the inside of a profile section of the driver 21, which profile section is of approximately square design in cross section. A spring arrangement 35 of this type is described, for example, in DE 10 2005 046 807 B3, the disclosure of which in this regard is expressly incorporated here. The eccentric 27 which is acted upon by the spring arrangement 35 acts on the radially moveable catches 16 and pressurizes the latter such that they are pushed radially outward in order to mesh in the toothed ring, thus locking the first locking mechanism of the detent fitting 10.

A control disk 36 is arranged in the construction space axially between the catches 16 and the first fitting part 11 and in the present case is seated on the eccentric 27 in a torsionally rigid manner. The control disk 36 has control tracks—of which there are four in this case—which interact in each case with a lug 38 of each catch 16. In this case, the lugs 38 project in the axial direction from the catches 16 associated therewith. In the event of a rotation (by a few degrees) of the driver 21—and of the eccentric 27 driven by said driver, and of the control disk 36—counter to the force of the spring arrangement 35, the control disk 36 pulls the catches 16 radially inward, that is to say out of the toothed ring, and therefore the detent fitting 10 is unlocked and the two fitting parts 11 and 12 are rotatable relative to each other about the axis A. The backrest 4 is now pivotable about the axis A in order to be adjusted in terms of the inclination thereof, that is to say in order to adopt a different use position.

A fastening ring 24 is fixedly connected to an end of the driver 21 that projects out of the second fitting part 12.

After the detent fitting 10 is fastened to the vehicle seat 1, the first fitting part 11 is in (locked) connection to the backrest 4 as long as the free-pivoting lock (described below) is not unlocked. The second fitting part 12 is connected fixedly via the adapter 112 to the structure of the seat part 3, i.e. is fixed on the seat part. However, the assignments of fitting parts 11 and 12 may also be interchanged, that is to say the first fitting part 11 would then be fixed on the seat part and the second fitting part 12 would be in connection with the backrest 4. The detent fitting 10 therefore lies in the force flow between the backrest 4 and the seat part 3, and therefore the two fitting parts 11 and 12 are preferably composed of metal, in particular of steel.

The occupant of the vehicle seat 1 can adapt the inclination of the backrest to his individual comfort requirements. The comfort adjustment range of the backrest is defined by a stop 112a, which is fixedly connected to the adapter 112 which is fixed on the seat part, engaging between a first cam 120 and a second cam 130 of the detent plate 115. The first cam 120 and the second cam protrude above a circular basic geometry of the detent plate 115, which circular basic geometry runs concentrically with respect to the axis A, in the radial direction as functional geometries. A first stop surface 120a which faces the stop 112a is formed on the first cam 120, and a second stop surface 130a which faces the stop 112a is formed on the second cam 130, of which stop surfaces one in each case bears against the stop 112a in one of the two end points of the comfort adjustment range of the backrest and prevents further adjustment of the detent fitting 10. The distance between first stop surface 120a and second stop surface 130a is greater than the dimension of the stop 112a lying between said stop surfaces 120a, 130a, as a result of which the comfort adjustment range of the backrest is defined.

The detent plate 115 is pushed with a circular opening, which lies concentrically with respect to the axis A, onto a circular step of the first fitting part 11, which circular step likewise lies concentrically with respect to the axis A. The detent plate 115 is preferably laser-welded to the first fitting part. The step has a diameter D of preferably 60 mm and, in applications of the detent fitting 10 without a free-pivoting device, serves for connecting the first fitting part 11 onto the seat structure, preferably onto the structure of a backrest 4.

Apart from said disk-shaped unit with the components of the first locking mechanism contained therein, the detent fitting 10 also comprises a free-pivoting device as a second locking mechanism. The two locking mechanisms can be operated independently of each other. The third fitting part 74 is mounted on the first fitting part 11, on the side thereof which faces away from the second fitting part 12, by means of the bearing ring 71, which is fastened to the first fitting part 11. The substantially plate-like third fitting part 74 is connected to the backrest structure of the backrest 4 and, for the centrally effected free pivoting relative to the first fitting part 11, is pivotable about the central axis A (which is defined by the bearing ring 71) which lies parallel to the unlocking shaft 7. Insofar as nothing to the contrary is described, all the rotations described below run about axes of rotation which are aligned parallel to the axis A.

The bearing ring 71 has a circular-ring-shaped basic geometry with a periphery approximately constant cross section which has a web running in the direction of the axis A and, at the two webs ends, a respective limb running perpendicularly to the web. The two limbs run here from the web ends in directions which are radial and are opposed to one another, and therefore the cross section approximately has a Z shape.

A play which is optionally present in the detent fitting 10 can be adjusted by the bearing surface of the bearing ring 71 and the inner surface of the bearing opening in the third fitting part 74 being of noncircular design in such a manner that, by rotation of the bearing ring 71 before the fastening thereof, in particular laser welding, to the first fitting part 11, the play can be adjusted. Such a manner of adjusting the play is known, for example, from DE 100 41 604 B4.

When the vehicle seat 1 is in use, the third fitting part 74 is locked to the first fitting part 11. For this purpose, the detent plate 115 fastened to the first fitting part 11 has, as further functional geometry, a projection 140 which projects in the radial direction over the circular basic geometry of the detent plate 115 and interacts with a pawl 80 which is mounted rotatably by means of a bearing bolt 82 on that side of the third fitting part 74 which faces the first fitting part 11.

The pawl 80 has a basic geometry similar to an L shape with a long limb and a short limb. A circular hole in that end region of the long limb which faces away from the short limb serves for receiving the bearing bolt 82 and, together with said bearing bolt, forms the bearing point of the pawl 80 in a first hinge point D1 on the third fitting part 74. In the connecting region between the long limb and the short limb of the pawl 80 a locking cam 80a is formed for interacting with a locking surface 140b of the projection 140. In order to lock the third fitting part 74 to the first fitting part 11, the locking cam 80a is supported in the free pivoting direction on the locking surface 140b of the projection 140.

A eccentric bolt 84 which serves as a stop on the third fitting part 74 serves for defining the pivoting movement of the third fitting part 74 in the rearward pivoting direction of the backrest 2 by the eccentric bolt 84 running against a supporting surface 140a of the projection 140 when the use position of the backrest 4 is reached again once the free pivoting has been completed. To compensate for manufacturing tolerances, the eccentric bolt 84 is stepped in the axial direction thereof with substantially cylindrical steps which are eccentric to one another. A cylindrical portion of the eccentric bolt 84 inserted into a circular hole of the third fitting part 74 is offset radially by an eccentricity in the radial direction to a further cylindrical portion of the eccentric bolt 84, wherein the last-mentioned cylindrical portion comes into contact with the supporting surface 140a when the use position is reached again. When the eccentric bolt 84 is rotated about the cylindrical portion inserted into the third fitting part 74, the center point of the cylindrical portion coming into contact with the supporting surface 140a is thereby moved along a circular path, the radius of which corresponds to the eccentricity. During the installation of the fitting the eccentric bolt 84 is rotated in relation to the third fitting part 74 until the nominal position of the third fitting part 74 relative to the first fitting part 11 has been set; the eccentric bolt 84 is then fixed on the third fitting part 74, in particular is welded thereto.

In order to compensate for manufacturing tolerances, the bearing bolt 82 can also be constructed in a correspondingly eccentrically stepped manner. A cylindrical portion of the bearing bolt 82 that is inserted into a circular hole of the third fitting part 74 then has a center axis which is radially offset with respect to a parallel center axis, which defines the first hinge point D1, of a cylindrical portion serving for the mounting of the pawl 80. As a result, the eccentricity of the bearing bolt 82 is defined. When the bearing bolt 82 rotates about the cylindrical portion inserted into the third fitting part 74, the first hinge point D1 moves along a circular path, the radius of which corresponds to the eccentricity. During the installation of the fitting, the bearing bolt 82 is rotated in relation to the third fitting part 74 until the first hinge point D1 has reached the optimum position thereof, and the pawl 80, by means of maximum engagement of the locking cam 80a, is in engagement in a play-free manner on the locking surface 140b of the projection 140, in the present case within, alternatively outside, the angular range of the self-locking; the bearing bolt is then fixed on the third fitting part 74, in particular is welded thereto.

A locking cam 90 is mounted rotatably on the third fitting part 74 in a second hinge point D2, which is spaced apart from the first hinge point D1, on the side facing the first fitting part 11. For this purpose, the locking cam 90 has, at one end, a bearing journal 90a which projects perpendicularly from the locking cam 90, runs parallel to the axis A and is inserted by means of a bushing 94 into an opening of the third fitting part 74. The free end of the bearing journal 90a projects through the third fitting part 74 and, on the side facing away from the first fitting part 11, projects over the substantially plate-like basic geometry of the third fitting part 74. The free end of the bearing journal 90a is of profiled design, in particular of polygonal design. A component formed with a corresponding mating profile can be pushed on in the axial direction such that a tortionally fixed connection is provided between the bearing journal 90a and the pushed-on component. In the present case, the pushed-on component is a lever (not illustrated in the figures) which is operatively connected via a cable pull to the hand lever 8, which is fastened in the upper region of the backrest 4. Actuation of the hand lever 8 rotates the bearing journal 90a, and therefore the locking cam, about the second hinge point D2.

A coupler 98 with a flat, elongated basic shape is connected at a first end in a third hinge point D3 to that end of the locking cam 90 which faces away from the bearing journal 90a. The second end of the coupler 98 is connected in a fourth hinge point D4 to the short limb of the pawl 80.

The third hinge point D3 is formed by a cylindrical journal 90b which protrudes parallel to the axis A at that end of the locking cam 90 which faces away from the bearing journal 90a and engages in an elongated hole of the first end of the coupler 98. Owing to the pairing of the cylindrical journal 90b with the elongated hole of the coupler 98, the third hinge point D3 is designed as a turning and sliding joint and thus, in addition to a pure turning movement, also permits a translation, which is defined by the elongated hole geometry, between coupler 98 and locking cam 90.

The fourth hinge point D4 is formed by a rivet 96 which is inserted through a circular hole of the second end of the coupler 98 and a circular hole in the end region of the short limb of the pawl 80 and is riveted in such a manner that a pure turning joint is created.

The pawl 80 which is mounted in the first hinge point D1 on the third fitting part 74, the locking cam 90 which is mounted in the second hinge point D2 on the third fitting part 74, and the coupler 98 which is connected in an articulated manner to the locking cam 90 in the third hinge point D3 and to the pawl 80 in the fourth hinge point D4 define a substantially flat four-bar chain (which is coupled to the third fitting part 74) which serves for unlocking and locking the free-pivoting function.

A cover 78 which is fastened on the third fitting part 74 at least partially covers the abovementioned individual parts of the free-pivoting device and protects same from soiling. The bearing bolt 82, the locking cam 90 and the eccentric bolt 84 are supported or mounted in an opposite hole pattern in the cover 78 in addition to being mounted in the holes of the third fitting part 74.

Figure 9:
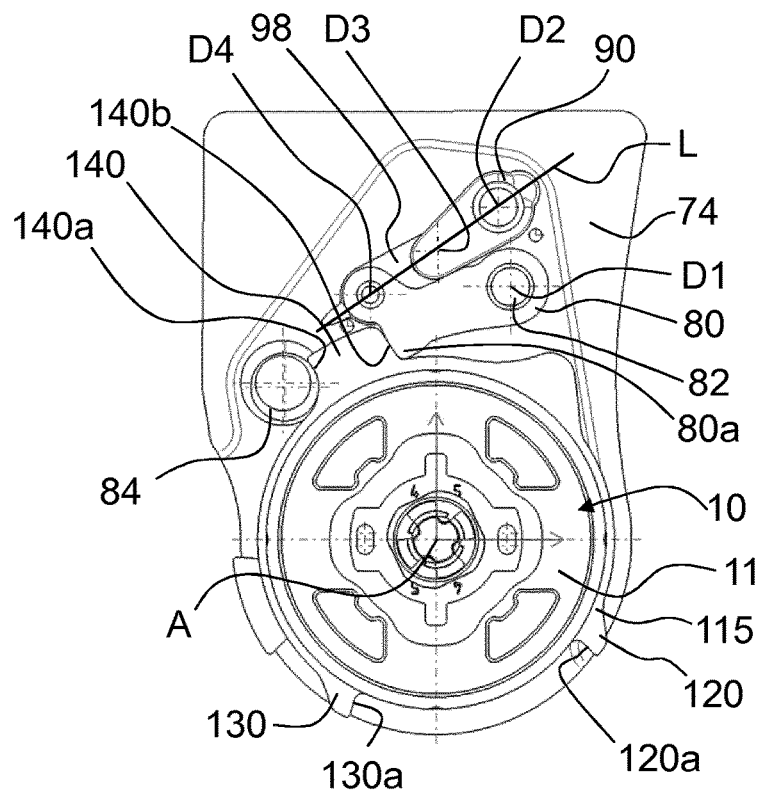
FIG. 9 is a top view of the detent fitting in the locked state of the free-pivoting device without a cover and without a retaining spring.
Figure 10:
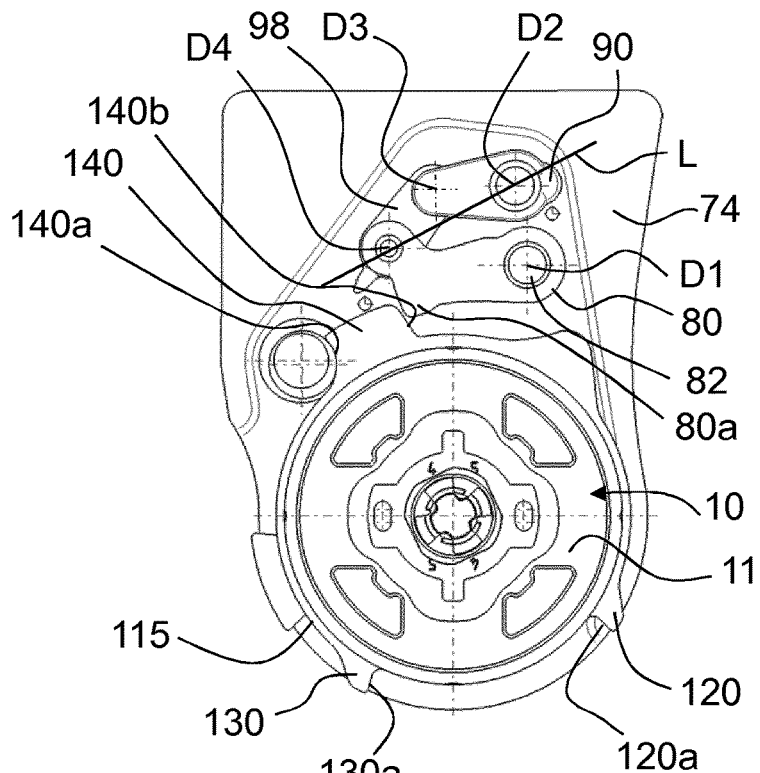
FIG. 10 is a view corresponding to FIG. 9 during the unlocking of the free-pivoting device.
Figure 11:
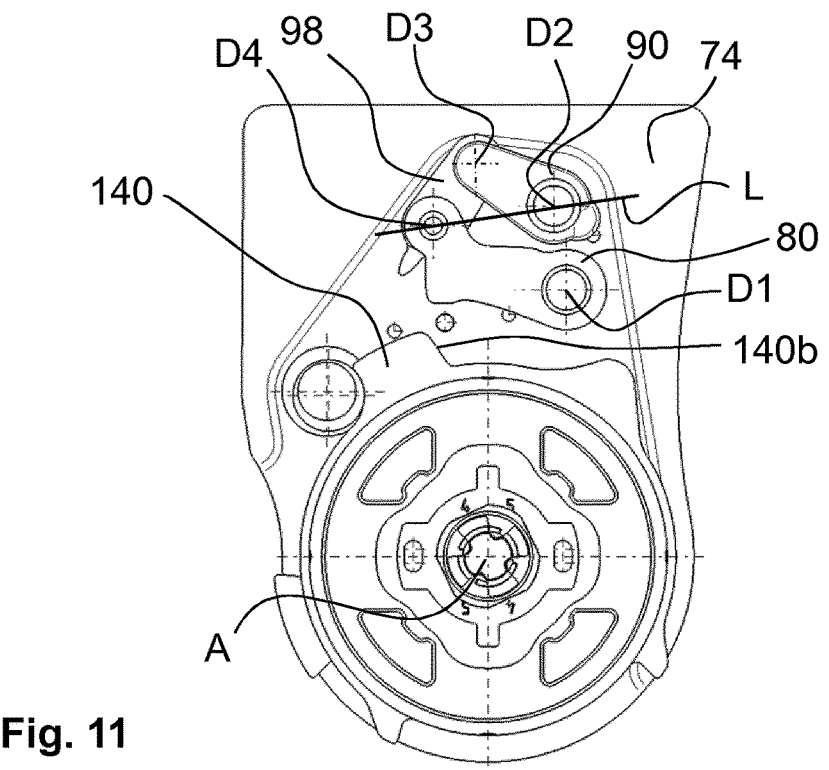
FIG. 11 is a view corresponding to FIG. 9 of the completely unlocked free-pivoting device.
Figure 12:
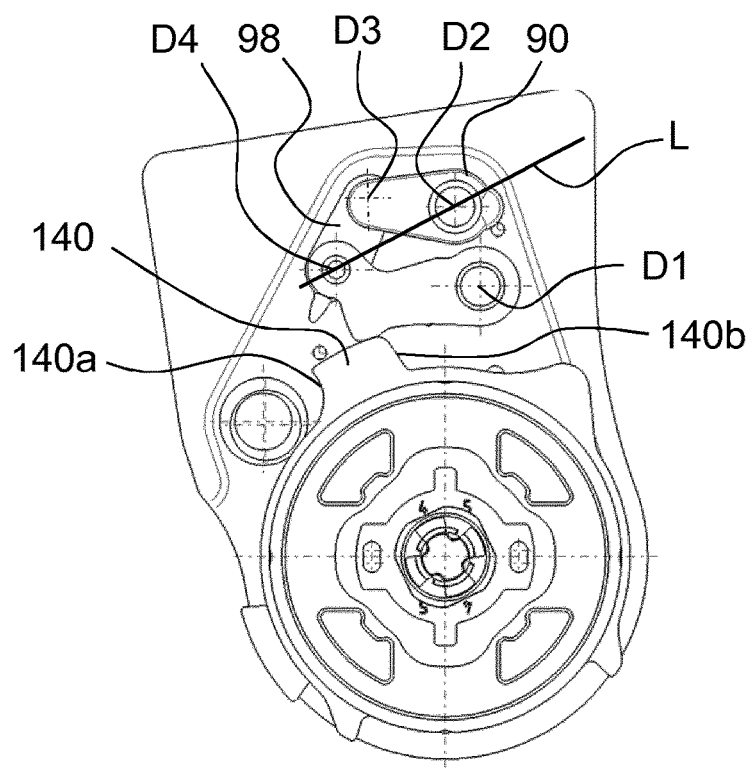
FIG. 12 is a view corresponding to FIG. 9 of the unlocked free-pivoting device while the backrest is freely pivoted.

In a locked state of the use position, the pawl 80 has meshed, i.e. the locking cam 80a is supported on the locking surface 140b. A spring 92 which is effective between locking cam 90 and third fitting part 74 acts upon the locking cam 90 with a torque in the direction of contact against the pawl 80 (counterclockwise in FIG. 9). The pawl 80 is thereby held in the locked position thereof under normal use loads. The third hinge point D3 lies on an imaginary connecting line L between the second hinge point D2 and the fourth hinge point D4 or (depending on the tolerance position) slightly between the connecting line L and pawl 80. The locking cam 90 and the coupler 98 are thereby oriented virtually in a line. The cam 90 is supported laterally on the pawl 80 such that the third hinge point D3 cannot move further in the direction of the pawl 80. As a result, the four-bar chain is in a locked (dead center) position; even high crash forces acting on the pawl 80 cannot open the pawl 80 because of the extended position of locking cam 90 and coupler 98 and the support of the cam 90 on the pawl 80. When the third hinge point D3 is designed as a turning and sliding joint, in the event of a crash the small, defined translation path in the joint is traversed until the bearing journal 90a bears against an edge of the elongated hole of the coupler 98.

During the unlocking of the free-pivoting function, by actuation of the hand lever 8, the locking cam 90 is pivoted away from the pawl 80 counter to the force of the spring 92. The third hinge point D3 is moved onto that side of the connecting line L which faces away from the pawl 80. By means of the coupler 98, the locking cam 90 pulls the pawl 80 out of the locked position, and therefore the locking cam 80a of the pawl 80 no longer bears against the locking surface 140b, and the third fitting part 74 is moveable together with the backrest in the free-pivoting direction. The backrest 4 can be freely pivoted. If the third hinge point D3, as described previously, lies between the connecting line L and the pawl 80 in the locked state of the free-pivoting device, the design of the third hinge point D3 as a turning and sliding joint enables same to exceed the extended position, i.e. the connecting line L, during the unlocking operation. In a modified embodiment, one of the other hinge points D1, D2, D4 is designed as a turning and sliding joint instead of the third hinge point D3. The remaining hinge points are designed as pure turning joints.

In order to permit secure unlocking of the free-pivoting function under all tolerance conditions, the pawl 80 can be pivoted a little further in the opening direction.

During the free-pivoting operation, the locking cam 80a of the pawl 80 rests on the radially outer boundary of the projection 140 and slides along same. The hand lever 8 can therefore remain unactuated even after a small free-pivoting angle. The third fitting part 74 and therefore the backrest 4 are pivoted back and locked in the reverse sequence.

A retaining spring 86 which is fastened to the bearing bolt 82 bears with a spring arm 86a against the projection 140 with prestressing in the axial direction. If the third fitting part 74 is pivoted forward to a large extent, the spring arm 86a leaves the projection 140 and springs in the direction of the pawl 80 which, as a result, is prevented from meshing behind the supporting surface 140a.

According to the invention, the projection 140 is integrally formed on the detent plate 115, i.e. the projection forms an integral part of same in a material unit and is not a separately produced component which is fastened retrospectively. The first cam 120 and the second cam 130 are preferably also integrally formed on the detent plate 115 (or on the bearing ring 71).

Various embodiments for the projection 140 and the pawl 80 are possible. In a modified embodiment, the pawl 80 can have a plurality of teeth which interact with a plurality of toothed spaces in the projection 140.

The features disclosed in the description above, in the claims and in the drawings may be of importance both individually and in combination for realizing the invention in the various refinements thereof. While specific embodiments of the invention have been shown and described in detail to illustrate the application of the principles of the invention, it will be understood that the invention may be embodied otherwise without departing from such principles.

The invention claimed is:

1. A detent fitting for a vehicle seat, the detent fitting comprising:
   a first fitting part;
   a second fitting part rotatable relative to the first fitting part;
   catches which are guided movably in one of the two fitting parts;
   a toothed ring connected to the other of the two fitting parts, the catches being guided between a locked state and an unlocked state, and which, in the locked state, interact with the toothed ring of the other of the two fitting parts in order to lock the detent fitting;
   a third fitting part which is mounted pivotably relative to the first fitting part;
   a detent plate;
   a locking cam;
   a coupler; and
   a pawl, wherein the third fitting part is lockable with the detent plate fastened to the first fitting part or with the first fitting part by means of the pawl which is mounted in a first hinge point on the third fitting part, and the third fitting part, the locking cam, which is mounted in a second hinge point on the third fitting part, the coupler which is connected in an articulated manner to the locking cam in a third hinge point and to the pawl in a fourth hinge point, and the pawl define a four-bar linkage.

2. The detent fitting as claimed in claim 1, wherein at least one of the hinge points of the four-bar linkage is designed as a turning and sliding joint and the remaining hinge points are designed as turning joints.

3. The detent fitting as claimed in claim 2, wherein the second hinge point is designed as a turning and sliding joint and the remaining hinge points are designed as turning joints.

4. The detent fitting as claimed in claim 1, further comprising a spring, wherein the four-bar linkage is pretressed in the direction of the locked position of the pawl via the spring.

5. The detent fitting as claimed in claim 4, wherein the spring prestresses the locking cam in the direction of the locked position of the pawl.

6. The detent fitting as claimed in claim 4, wherein the spring pivots the locking cam into contact against the pawl.

7. The detent fitting as claimed in claim 4, wherein in order to unlock the pawl, the locking cam is pivoted counter to a force of the spring and, in the process, the four-bar linkage moves the pawl in the direction of the unlocked position thereof.

8. The detent fitting as claimed in claim 1, wherein in the locked state of the pawl, the third hinge point lies on an imaginary connecting line between the second hinge point and the fourth hinge point.

9. The detent fitting as claimed in claim 8, wherein during the unlocking operation of the pawl, the third hinge point is moved by means of the four-bar linkage onto a side of the connecting line which faces away from the pawl.

10. The detent fitting as claimed in claim 1, wherein in the locked state of the pawl, the third hinge point lies between an imaginary connecting line between the second hinge point and the fourth hinge point and the pawl.

11. The detent fitting as claimed in claim 10, wherein, during an unlocking operation of the pawl, the third hinge point is moved by means of the four-bar linkage onto a side of the connecting line which faces away from the pawl.

12. The detent fitting as claimed in claim 1, wherein the locking cam comprises a bearing journal which is mounted rotatably in an opening of the third fitting part, thus forming the second hinge point, and the bearing journal has an interface for at least an indirect connection to a hand lever.

13. The detent fitting as claimed in claim 12, wherein the bearing journal has an interface in polygonal form.

14. The detent fitting as claimed in claim 13, wherein a bearing ring is welded to the first fitting part.

15. The detent fitting as claimed in claim 1, wherein a bearing ring is connected to the first fitting part, and the bearing ring supports the third fitting part relative to the first fitting part.

16. A motor vehicle seat comprising:
   a detent fitting comprising:
      a first fitting part
      a second fitting part that is rotatable relative to the first fitting part;
      catches guided movably in one of the two fitting parts;
      a toothed ring connected to the other of the two fitting parts, the catches being guided between a locked state and an unlocked state, and which, in the locked state, interact with the toothed ring of the other of the two fitting parts in order to lock the detent fitting;
      a third fitting part mounted pivotably relative to the first fitting part;
      a detent plate;
      a locking cam;
      a coupler; and
      a pawl, wherein the third fitting part is lockable with the detent plate fastened to the first fitting part or with the first fitting part by means of the pawl which is mounted in a first hinge point on the third fitting part, and the third fitting part, the locking cam, which is mounted in a second hinge point on the third fitting part, the coupler, which is connected in an articulated manner to the locking cam in a third hinge point, and to the pawl in a fourth hinge point, and the pawl define a four-bar linkage;
   a seat part which is connected to the second fitting part; and
   a backrest which is connected to the third fitting part.

* * * * *